M. SIMON.
NUT LOCK.
APPLICATION FILED JAN. 23, 1913.
1,075,605.
Patented Oct. 14, 1913.
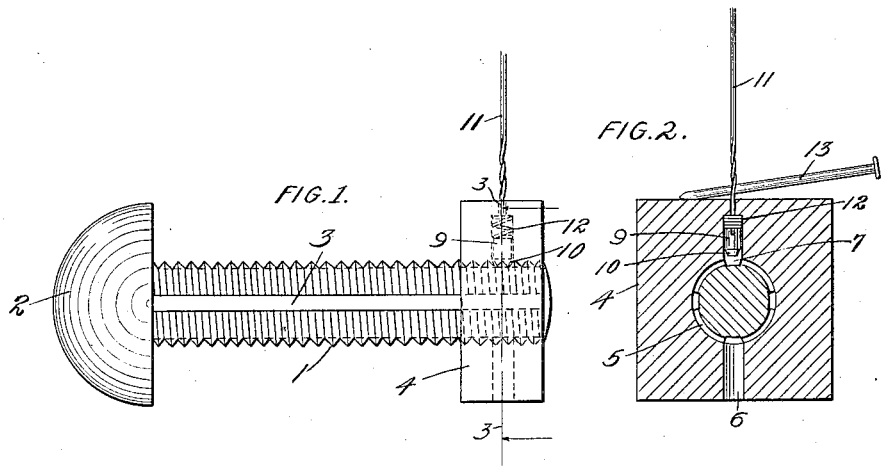
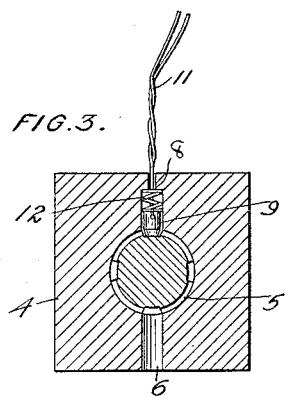
FIG. 4.
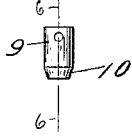
FIG. 5.
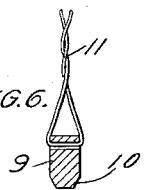
FIG. 6.
WITNESSES
Paul A. Viersen.
Leona V. Daughtry.
INVENTOR
M. Simon
H. Sanders
BY              ATT'Y.

UNITED STATES PATENT OFFICE.

MORECZ SIMON, OF EAST CHICAGO, INDIANA.

NUT-LOCK.

1,075,605.

Specification of Letters Patent.

Patented Oct. 14, 1913.

Application filed January 23, 1913. Serial No. 743,735.

*To all whom it may concern:*

Be it known that I, MORECZ SIMON, a citizen of Hungary, residing at East Chicago, in the county of Lake and State of Indiana, have invented certain new and useful Improvements in Nut-Locks, of which the following is a specification.

This invention relates to improvements in lock nuts and its object is to produce a device of this class in which the bolt is formed with a plurality of longitudinal grooves extending from its head to its end and which has mounted upon its threaded portion a nut that may be adjusted thereon to any position desired and then locked in that position in such a manner that its movement upon the bolt at any time thereafter will be effectually prevented.

With the foregoing and other objects in view the invention consists in the combination and arrangement of parts to be hereinafter fully described in the following specification, pointed out in the claim and illustrated in the accompanying drawing which forms a part of said specification and in which—

Figure 1 is a side elevation of my improved nut lock. Fig. 2 is a cross section showing one means of releasing the locking dog so that it may engage the bolt and effectually lock the same in engagement with the nut. Fig. 3 is a similar view with the locking dog in another position and is taken on line 3—3 of Fig. 1. Fig. 4 is a view of the spring employed. Fig. 5 is a view of the locking dog employed. Fig. 6 is a section taken on line 6—6 of Fig. 5.

Like reference characters indicate corresponding parts throughout the several views.

1 is the bolt formed with the usual head 2 and with a plurality of longitudinally extending grooves 3 which extend from the head to the opposite end of the bolt.

4 is the nut formed with the usual central opening 5 and threaded upon the bolt and further provided with an aperture 6 extending from one lateral face of the nut to its central opening 5. Diametrically opposite the opening 6 is an aperture 7 of substantially the same diameter as the aperture 6 and which extends from the central opening 5 in alinement with the opening 6 over half the distance to the adjacent lateral face of the nut and at a convenient point as at 8 its diameter is materially diminished, thus forming a cavity, and the relatively smaller opening leads to the adjacent face of the nut.

9 is a locking dog having one extremity beveled as at 10 and provided near its opposite extremity with a transverse aperture through which a piece of wire 11 or other flexible material is projected.

12 is a spring adapted to reside upon the non-beveled end of the locking dog.

Before the bolt is introduced into the apertured portion of the nut the wire 11, spring 12 and locking dog 9 in the order named are introduced into the apertured portion 6 of the nut and drawn entirely through that portion and through the central opening 5 of the nut, the ends of the wire 11 passing entirely through the opening 7 and beyond the adjacent lateral face of the nut, the spring 12 and locking dog 9 remaining in the cavity formed by the relatively large portion of the aperture 7. The bolt 1 is now introduced into the nut, the dog 9 being retained out of contact therewith through the medium of the wire 11. When the nut has arrived at the position upon the bolt desired and one of the grooves 3 is in alinement with the aperture 7 the pull upon the wire 11 is abated when the spring 12 resting upon the base of its cavity will force the dog into locking engagement with the grooved portion of the bolt and effectually prevent further movement of the nut.

To permanently lock the nut the wire 11 may be twisted as illustrated in Fig. 2 and a stout metal piece 13 wedged between the strands with one end resting upon the nut when an upward stress upon the opposite end will break the wire when the spring will keep the dog permanently in locked engagement with the bolt.

What is claimed is:—

The combination with a bolt formed with a plurality of longitudinally extending grooves, of a nut threaded thereon formed with an aperture extending from one of its lateral faces to its central opening and with an alined cavity opening into said central opening and communicating with an aperture that extends to the opposite lateral face of the nut, a spring-pressed dog disposed in said cavity for locking engagement with the grooved portion of the bolt and a flexible member engaging said spring-pressed dog and passing through the last named aperture.

In testimony that I claim the foregoing as my own I have hereto affixed my signature in the presence of two subscribing witnesses.

MORECZ SIMON.

Witnesses:
  LEONA V. DAUGHTRY,
  CHAS. E. GORTON.

Copies of this patent may be obtained for five cents each, by addressing the "Commissioner of Patents, Washington, D. C."